Sept. 10, 1929.  G. H. ROSSEBO  1,727,521
POP CORN MACHINE
Filed July 7, 1928   2 Sheets-Sheet 1
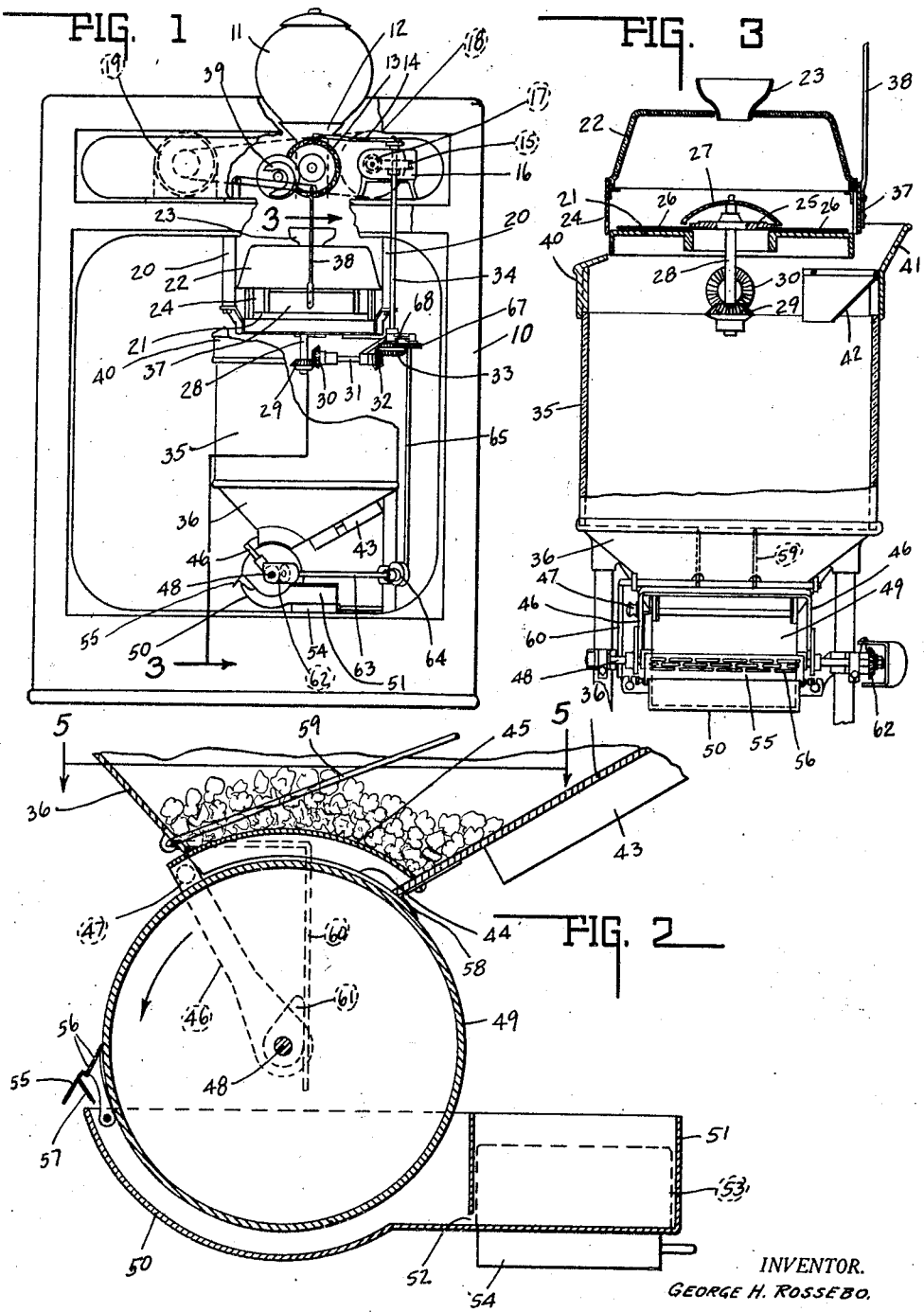
INVENTOR.
GEORGE H. ROSSEBO.
BY
ATTORNEYS.

Sept. 10, 1929.   G. H. ROSSEBO   1,727,521
POP CORN MACHINE
Filed July 7, 1928   2 Sheets-Sheet 2
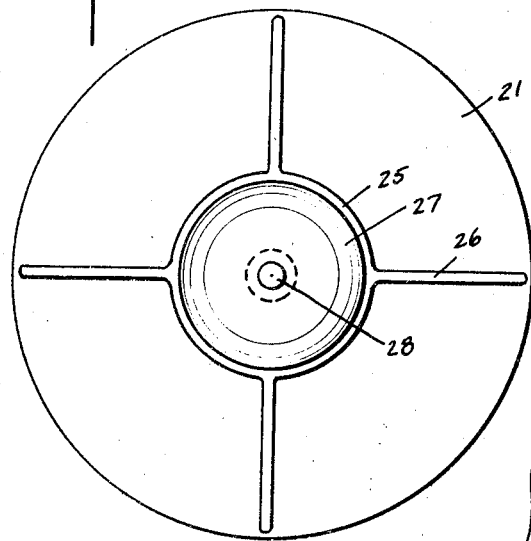
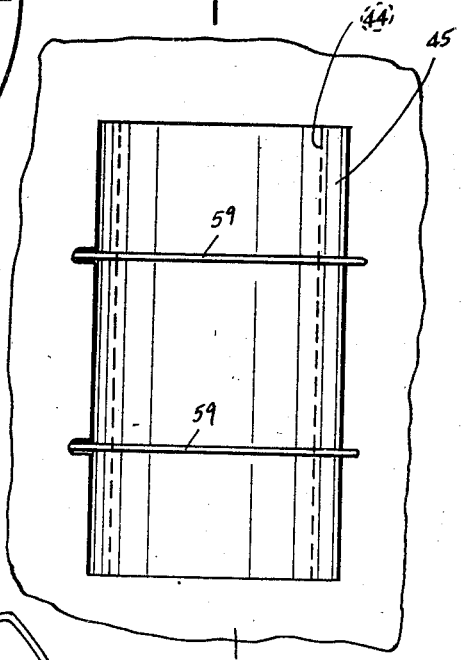
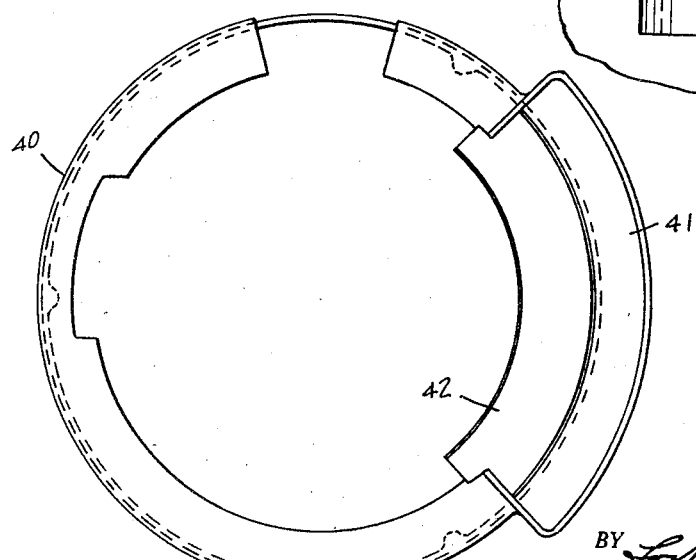
INVENTOR.
GEORGE H. ROSSEBO.
BY
ATTORNEYS.

Patented Sept. 10, 1929.

1,727,521

UNITED STATES PATENT OFFICE.

GEORGE H. ROSSEBO, OF INDIANAPOLIS, INDIANA, ASSIGNOR TO HOLCOMB & HOKE MANUFACTURING COMPANY, OF INDIANAPOLIS, INDIANA, A CORPORATION.

POP-CORN MACHINE.

Application filed July 7, 1928. Serial No. 290,942.

This invention relates to a pop corn machine, of that type wherein the popping corn is automatically fed to an electrically heated popping plate, discharged therefrom and buttered.

One object of the invention is to provide a receptacle for the popped corn which will be completely closed to protect the popped corn from dust and dampness until it is ready to be sold, while at the same time permitting observation thereof to advertise the wares and attract purchasers. By means of this arrangement not only is the purchaser assured of having uncontaminated, clean popped corn but it is kept warm and crisp.

Another feature of the invention resides in the buttering mechanism operated in conjunction with the container so that the corn is buttered only when it is removed for sale. Thus, the purchaser is assured of freshly buttered popped corn. Other features of the buttering mechanism will be hereinafter more fully set forth and described.

The full nature of the invention will be understood from the accompanying drawings and the following description and claims:

Fig. 1 is a side elevation of a cabinet containing the pop corn machine. Fig. 2 is a central vertical section through the buttering mechanism and the bottom of the container. Fig. 3 is an enlarged section taken on the line 3—3 of Fig. 1 with the cabinet and parts removed. Fig. 4 is a plan view of the popping plate. Fig. 5 is a section taken on the line 5—5 of Fig. 2 with parts removed. Fig. 6 is a plan view looking down on the pop corn container.

In the drawings there is shown a pop corn machine encased within a cabinet 10, upon the top of which is mounted the corn hopper 11, supported upon a measuring and dispensing housing 12 of the character illustrated in Letters Patent No. 1,575,005, issued March 2, 1926. The corn is discharged from the hopper and housing 12 in the proper quantity and at predetermined intervals through the medium of the ratchet wheel 13, which is periodically driven in the usual manner by the pawl 14 actuated by worm wheel 15 contained within housing 16 and driven by the worm 17 which is connected with the pulley 18 driven by a motor 19.

Mounted in the lower portion of the cabinet and suspended from the top by the rods 20 there is a popping plate 21 covered by a transparent glass bowl 22 into which the corn is discharged from the hopper 11 through the discharge spout 23. The popping plate 21 is heated by a suitable electrical element in the usual manner and is surrounded by the side guard 24 upon which the transparent cover 22 rests. Rotatably mounted above the popping plate there is a disk 25 having radially extending scraper fingers 26, said disk being protected by the cover 27 which deflects the corn from the center in scattered position about the plate. The arms 26 are caused to rotate about the plate so as to agitate the corn and prevent it from sticking and burning, by the centrally disposed shaft 28, said shaft extending downwardly through the popping plate and having a bevel gear 29 on the lower end thereof adapted to mesh with the bevel gear 30 driven by the shaft 31 through the medium of the bevel gears 32 and 33, the latter being mounted on the driving shaft 34 extending through the upper portion of the cabinet and keyed to the worm gear 15.

Immediately below the popping plate there is a glass container or reservoir 35 having a hopper-like metal bottom 36 which is adapted to receive the popped corn when it is discharged from the popping plate 21. For discharging the corn from the hopper plate there is provided a vertically slidable gate 37 connected with the rod 38 which is adapted to be raised so as to open an aperture in the guard wall 24 to permit the popped corn to be swept therefrom by the rotating finger 26 into the glass reservoir or container 35. The rod 38 is operated in raised position at timed intervals by a cam 39 driven from the ratchet wheel 13.

The top of the glass wall of container 35 carries a collar 40 provided with a flared upwardly extending flange providing a mouth 41 which catches the corn discharged through the gate 37. Secured to the inner periphery of the collar there is a deflector plate 42 which causes the popped corn to be distributed in and about the container so that it will not pile up on one side.

The hopper-like bottom 36 of the container has secured thereon an electric heating element 43 for keeping the popped corn warm. Said hopper-like bottom also is formed with the discharge opening indicated at 44 which is normally closed by the gate 45. Said gate is pivotally mounted to swing back and forth in an arc corresponding to the shape of the gate and concentric with its pivotal mounting. The mounting of the gate includes an arm 46 having an operating knob 47 which an operator may use to open or close the same.

The arm 46 is pivoted to the shaft 48 which carries a buttering cylinder 49 rotatably mounted in the buttering trough 50 which is fed with melted butter from the heated butter container 51 through the opening 52. The butter 53 contained therein is melted by the heating element 54 secured to the bottom thereof. Mounted along one edge of the buttering trough 50 there is a scraper 55 which is provided with a plurality of perforations 56 and a deflector 57. Said scraper is adapted to engage the surface of the buttering cylinder and scrape any excess butter therefrom causing it to pass through the perforations 56 and be directed back into the trough by the deflector 57, while scraping the popped corn which may adhere to the buttered surface and causing it to be directed into the cabinet. A second scraper 58 is secured to the hopper 36 in position to engage the surface of the cylinder for sealing the discharge mouth of the hopper and preventing corn from passing therethrough.

Pivotally mounted in the mouth of the hopper there are a plurality of agitating fingers 59 terminating in a downwardly extending rod 60 which is adapted to be engaged by the cam 61 mounted on the shaft 48. The engagement thereof by the cam causes the fingers 59 to be periodically raised in the hopper so as to agitate and stir the corn therein.

The shaft 48, upon which the buttering cylinder is mounted, is driven by the bevel gears 62 through the shaft 63, bevel gears 64 and vertical shaft 65. The upper end of the vertical shaft is provided with a gear 67 meshing with the gear 68 on the shaft 34.

From the foregoing it will be noted that when in operation, the corn is periodically discharged in measured quantities from the hopper 11 on to the popping plate. After being popped the corn is discharged through the gate 37 and distributed into the glass container 35. It remains in that container for protection and attraction to the customer until an order of popped corn is received. Thereupon the operator places his bag at a suitable position below the buttering cylinder, grasps the knob 47 and opens the gate 45. Thereupon the popped corn drops on to the butter surface of the cylinder 49 and is carried thereon until it strikes the scraper 55 which deflects the popped and buttered corn outwardly and into the bag.

The invention claimed is:

1. A pop corn machine including a popping element, means for feeding the corn thereon, means for discharging the corn therefrom after being popped, a normally closed receptacle associated with the popping element for receiving the popped corn and protecting it from dust and moisture until ready to be dispensed, a plurality of wire fingers pivotally mounted in the bottom of said receptacle and extending across the bottom portion thereof, and means for moving said fingers about their pivotal mounting for agitating the corn contained in said receptacle and preventing the packing or bridging thereof at or near the bottom.

2. A pop corn machine including a popping element adapted to pop the corn received thereon, a buttering cylinder adapted to receive the popped corn and butter the same, a butter containing trough partially surrounding the lower portion of the cylinder, means for rotating the cylinder in the butter contained in said trough, a scraping plate associated with said cylinder for scraping the popped corn therefrom and deflecting it away from the cylinder, said plate being provided with a plurality of perforations for permitting the butter scraped thereby to pass therethrough, and a deflecting plate connected therewith for deflecting the butter passing through said perforations back into the buttering trough.

3. A pop corn machine including a popping element, means for feeding the corn thereon, means for discharging the corn therefrom after being popped, a normally closed receptacle associated with the popping plate for receiving the popped corn and protecting it from dust and moisture until ready to be dispensed, a buttering cylinder mounted below said receptacle adapted to receive and butter the popped corn passing therefrom, and a gate positioned in the bottom of said receptacle for controlling the passage of popped corn on to said buttering cylinder.

4. A pop corn machine including a popping element, means for feeding the corn thereon, means for discharging the corn therefrom after being popped, a normally closed receptacle associated with the popping plate for receiving the popped corn and protecting it from dust and moisture until ready to be dispensed, a buttering cylinder mounted below said receptacle adapted to receive and butter the popped corn passing therefrom, a gate positioned in the bottom of said receptacle for controlling the passage of popped corn on to said buttering cylinder, a plurality of agitating fingers mounted in the lower portion of said receptacle, and a cam on said cylinder driving means for engaging and operating said fingers.

5. A pop corn machine including a popping element, means for feeding the corn thereon, means for discharging the corn therefrom after being popped, a normally closed receptacle associated with the popping element for receiving the popped corn and protecting it from dust and moisture until ready to be dispensed, a buttering cylinder mounted below said receptacle adapted to receive and butter the popped corn passing therefrom, a gate positioned in the bottom of said receptacle for controlling the passage of popped corn on to said buttering cylinder, a plurality of agitating fingers mounted in the lower portion of said receptacle, a cam on said cylinder driving means for engaging and operating said fingers, a trough for containing a quantity of butter in which said cylinder is adapted to rotate, and a scraping plate associated therewith having a plurality of perforations therein for deflecting the buttered popped corn from said cylinder and trough, and directing the excess butter passing through said perforations into said buttering trough.

In witness whereof, I have hereunto affixed my signature.

GEORGE H. ROSSEBO.